United States Patent Office 3,149,420
Patented Sept. 22, 1964

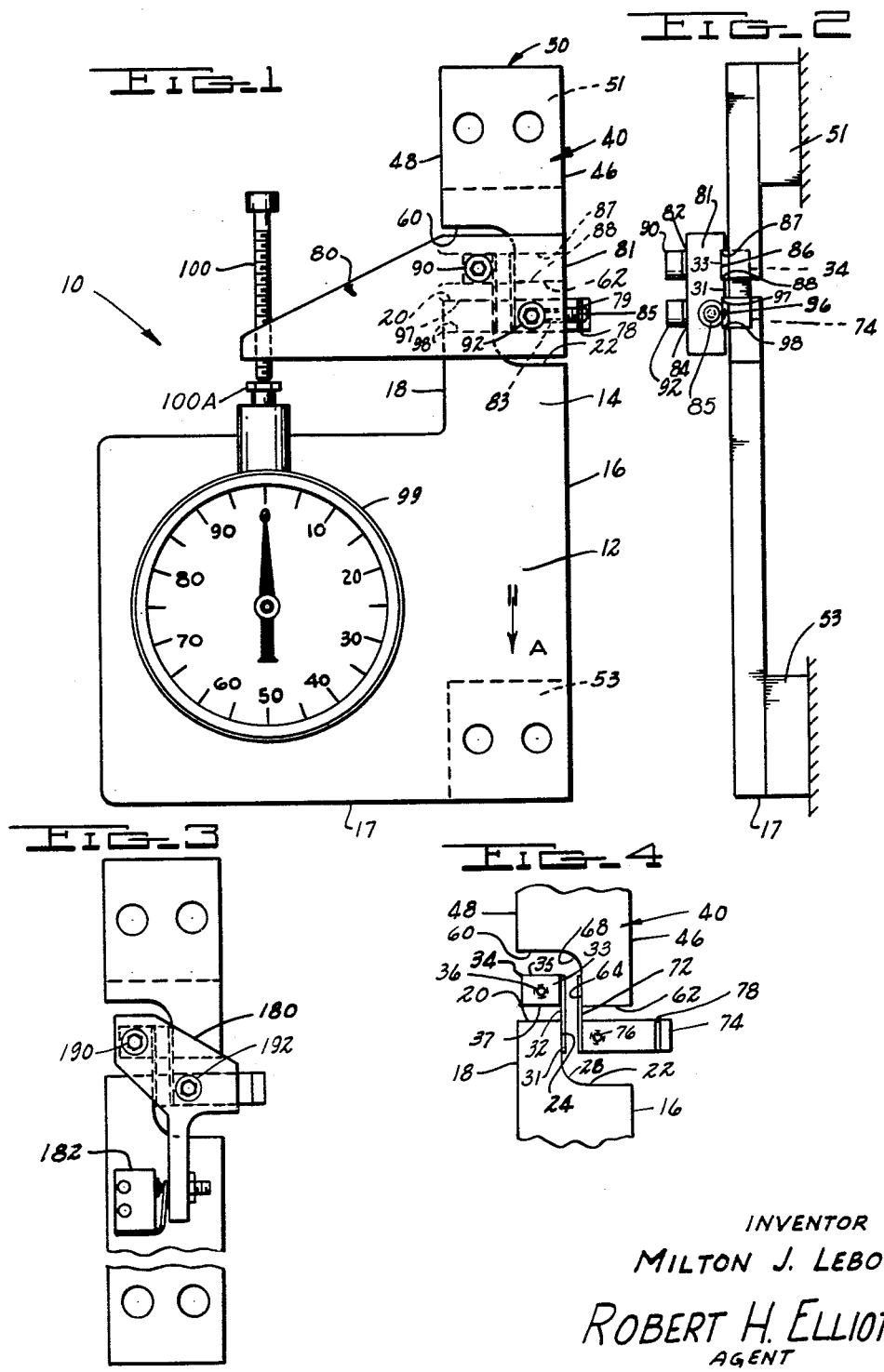

3,149,420
LOAD STRAIN INDICATOR
Milton J. Lebow, Oak Park, Mich., assignor to
Lebow Associates Inc., Detroit, Mich.
Filed Mar. 21, 1960, Ser. No. 16,528
1 Claim. (Cl. 33—147)

The present invention relates to new and useful improvements in load strain indicators and particularly to a device which when operated will indicate audibly or visually, when an overload occurs.

Throughout the years, many devices have been conceived and developed in an attempt to find a solution for this age old problem. Because of material size limitation, general complexity or cost, prior attempts to solve this problem have failed.

It is therefore a primary object of the present invention to provide a simple, self contained load strain indicator which is durable and efficient.

Another object of the present invention is the provision of a load strain indicator which can be readily applied with bolts or welding, to a press using non-skilled labor.

Still another object of the invention is the provision of a load strain indicator which is completely mechanical and does not require any electrical components unless press shutdown is required.

Another object of the present invention is the provision of a load strain indicator which is frictionless and will not expire when subjected to repeated shock and vibration.

These and other objects can be accomplished by the provision of a load strain indicator having a first flat body member; a second flat body member; a dial indicator positioned on said first body member; a pair of flexible beams, one end of each of said beams secured to each of said body members; an actuator bar; said actuator bar secured to the free ends of said flexible beam members with a portion thereof in contact with the dial indicator operating means; adjustable means on said actuator bar for zero adjustment of said dial indicator; and a mounting pad on each of said body members for securing said load strain indicator to a machine.

Other objects of this invention will appear in the following description and appended claim, reference being had to the accompanying drawings forming a part of this specification wherein like reference characters designate corresponding parts in the several views.

In the drawings:

FIG. 1 is a plan view of an overload protector which embodies the present invention.

FIG. 2 is a side elevation of the overload protector shown in FIG. 1.

FIG. 3 is a modified form of the present invention.

FIG. 4 is a partial top plan view of the beam members with the actuator removed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The load strain indicator assembly 10 illustrated in FIG. 1 of the drawings is adapted to be mounted in generally parallel relationship with a loaded press member. The body 12 of the load strain indicator is substantially flat and generally rectangular in configuration. However, the upper right hand corner has an extension 14 thereon which is integral with the body portion 12. The configuration of the extension is best viewed in FIG. 4 of the drawings. The right edge 16 of the extension is a continuation of the right vertical edge of the body 12. The left vertical edge 18 of the extension 14 is parallel to the right vertical edge 16. The top horizontal edge of the extension is cut away to form two substantially horizontal surfaces 20 and 22. Edge 22 intersects a vertical surface 24 which is generally parallel to the vertical edges 16 and 18 and positioned at right angles to the horizontal edge 20. The lower portion of edge 24 has an arcuate portion 28 which blends into horizontal edge 22.

Secured to the face of vertical edge 24 is a thin resilient beam member 32. The top surface 31 of the beam 32 is located in the same plane as the body 12. A rectangular block 34 is rigidly affixed to the end of the beam 32, the top surface 33 of the block 34 extending above the top surface 31 of the beam. A threaded opening 36 is centrally positioned in the block 34 and extends therethrough.

A second body member 40 of smaller size and similar configuration to the extension 14 is located in spaced relationship thereto. The small second body member 40 has vertical edges 46 and 48 which are positioned in alignment with edges 16 and 18. The top horizontal edge 50 of the small body member 40 lies in generally parallel relationship to the lower horizontal edge 17 of the large body 12. The intermediate horizontal edges 60 and 62 lie in parallel spaced relationship to the top edge 50. Between the parallel spaced edges 60 and 62 is a vertical edge 64 which lies in substantially parallel relationship to the vertical edges 46 and 48. An arc 68 joins the vertical edge 64 with edge 60.

Secured to the face of vertical edge 64 is a second thin resilient beam member 72. The top surface of the beam 72 is located in the same plane as the second small body member 40. A second rectangular block 74 is rigidly affixed to the end of the beam 72, the top surface of the block extending above the top surface of the beam. A threaded opening 76 is located adjacent the end of the beam and adapted to receive a threaded member therethrough for positioning an actuating bar member 80. The second rectangular block 74 has a slot 78 in the top surface thereof which is adapted to receive the edge of a washer member 79 which is adjustably affixed to the side 81 of the actuator bar 80. Threaded opening 83 in side 81 receives screw 85 which positions washer 79.

A pair of openings 82 and 84 are located in the top flat surface of the actuator bar 80. Immediately below the openings 82 and 84 are a pair of horizontal recesses 86 and 96 which are adapted to receive the rectangular blocks 34 and 74. Threaded members 90 and 92 position the actuator bar 80 with respect to blocks 34 and 74. Two horizontal surfaces 35 and 37 on block 34 engage two similar horizontal surfaces 87 and 88 in the actuator bar 80. The horizontal surfaces of block 74 are received between the surfaces 97 and 98 in the actuator bar 80. Surfaces 87, 88, 97, and 98 could of course be rotated 90°.

Therefore, any change in dimension between mounting pads in direction A causes the block 34 positioned on beam 32 to be displaced. This causes the block 74, positioned adjacent thereto to do the same thing. Because of the predetermined spaced relationship of beams 32 and 72 and the distance between the mounting members 90 and 92 as well as the threaded adjustable member 100 on the end of the actuator bar 80, a multiplication of the initial load-strain movement occurs. With a minute strain movement of body 12, the compound leverage action is transmitted to the dial indicator 99 which in turn indicates the strain applied to the member on which the strain indicator is mounted. Mounting pads 51 and 53 are located on the body members 12 and 40 and are adapted to engage the machine proper when the complete assembly 10 is mounted.

The device illustrated in FIG. 3 is similar to the first described unit, with one exception. The actuator 180 is of slightly different configuration and is adapted to actuate a micro switch rather than a visual dial indicator. The micro switch can do one of several things. The micro switch 182 can operate a relay to shut the press down, it can operate a warning light or bell, or it can do all three: the micro switch 182 when actuated will shut the press down, energize a warning light and then lastly ring a bell. The warning light or bell of course can be mounted on the machine if desired or can be remotely located throughout the plant in which the press is operating.

From the foregoing it will be apparent to one skilled in the art that the above described invention is simple and durable and when applied to a press will prevent overloading of equipment and consequent breakdown.

Having thus described my invention I claim:

In a load strain indicator for use on a machine, the combination of, a first flat body portion; a second flat body portion; a load strain dial indicator positioned on said first body portion; two parallel flexible beams, each secured at on end to a respective one of said body portions; an actuator bar; said actuator bar secured to the free end of each of said flexible beams and, in contact with a dial indicator operating means; adjustable means on said actuator bar for adjusting to a zero position on said dial indicator; and a pad on each of said body portions for securing said load strain indicator to a machine.

References Cited in the file of this patent
UNITED STATES PATENTS

| | | |
|---|---|---|
| 1,655,386 | Craig | Jan. 3, 1928 |
| 1,981,153 | Schoof | Nov. 20, 1934 |
| 2,011,931 | Dreyer | Aug. 20, 1935 |
| 2,158,649 | Armitage | May 16, 1939 |
| 2,293,733 | Guttman | Aug. 25, 1942 |
| 2,792,802 | Sagona | May 21, 1957 |

FOREIGN PATENTS

| | | |
|---|---|---|
| 253,521 | Germany | Nov. 11, 1912 |

OTHER REFERENCES

Publication, advertising folder entitled, United Pressuremeter, published by United Eng'g and F'dry Co., Pittsburgh, Pa., rec'd Aug. 19, 1936.